(12) United States Patent
Litke et al.

(10) Patent No.: US 8,188,157 B2
(45) Date of Patent: May 29, 2012

(54) UV CURABLE COATING COMPOSITIONS

(75) Inventors: Alan Edward Litke, Waterbury, CT (US); Victor Karol Kadziela, New Britain, CT (US)

(73) Assignee: Henkel Corporation, Rocky Hill, CT (US)

( * ) Notice: Subject to any disclaimer, the term of this patent is extended or adjusted under 35 U.S.C. 154(b) by 929 days.

(21) Appl. No.: 10/599,870

(22) PCT Filed: Apr. 12, 2005

(86) PCT No.: PCT/US2005/012336
§ 371 (c)(1),
(2), (4) Date: Oct. 12, 2006

(87) PCT Pub. No.: WO2006/028518
PCT Pub. Date: Mar. 16, 2006

(65) Prior Publication Data
US 2007/0197676 A1    Aug. 23, 2007

Related U.S. Application Data

(60) Provisional application No. 60/563,646, filed on Apr. 20, 2004.

(51) Int. Cl.
C08F 2/50 (2006.01)
C08F 2/44 (2006.01)
C08F 220/56 (2006.01)
C08F 220/18 (2006.01)
G02B 5/12 (2006.01)
B32B 5/30 (2006.01)

(52) U.S. Cl. .......... 522/46; 522/186; 524/879; 252/589; 526/194; 526/328; 526/328.5; 428/323; 428/327; 428/331; 428/908.8

(58) Field of Classification Search .............. 522/46, 522/186; 524/879; 252/589; 526/194, 328, 526/328.5; 428/323, 327, 331, 908.8
See application file for complete search history.

(56) References Cited

U.S. PATENT DOCUMENTS

| | | | |
|---|---|---|---|
| 4,108,840 A | | 8/1978 | Friedlander |
| 4,642,126 A | | 2/1987 | Zador et al. |
| 5,391,210 A | * | 2/1995 | Bilkadi et al. ............. 51/298 |
| 5,559,163 A | * | 9/1996 | Dawson et al. ............ 522/75 |
| 5,629,359 A | | 5/1997 | Peeters et al. |
| 5,677,050 A | * | 10/1997 | Bilkadi et al. ............. 428/331 |
| 6,265,061 B1 | * | 7/2001 | Kang et al. ............... 428/323 |
| 6,303,058 B1 | * | 10/2001 | Kelley et al. ............. 264/1.38 |
| 6,399,670 B1 | | 6/2002 | MacQueen et al. |

(Continued)

FOREIGN PATENT DOCUMENTS

WO    WO 96/36669    11/1996

(Continued)

OTHER PUBLICATIONS

Supplemental European Search Report, dated Jan. 30, 2008.

(Continued)

*Primary Examiner* — Michael Pepitone
(74) *Attorney, Agent, or Firm* — Steven C. Bauman

(57) ABSTRACT

UV curable coating compositions and methods for applying such compositions to surfaces to provide abrasion resistance and/or structural rigidity thereto. The UV curable compositions of the present invention include at least one curable (meth)acrylate, at least one photoinitiator which absorbs only in the UV range of the electromagnetic spectrum, and an inorganic filler, at least a portion of which having a particle size in the range of 1 to 1,000 nm. The compositions may further comprise a reactive diluent.

11 Claims, 2 Drawing Sheets

U.S. PATENT DOCUMENTS

| | | |
|---|---|---|
| 6,472,451 B2 | 10/2002 | Ha et al. |
| 6,730,388 B2 | 5/2004 | MacQueen et al. |
| 2002/0032251 A1 | 3/2002 | Ha et al. |
| 2003/0194549 A1 | 10/2003 | Perrine et al. |

FOREIGN PATENT DOCUMENTS

| | | |
|---|---|---|
| WO | WO 00/74074 | 12/2000 |
| WO | WO 01/53387 | 7/2001 |

OTHER PUBLICATIONS

Standard Practice for Calculating Yellowness and Whitness Indices from Instrumentally Measured Color Coordinates, ASTM E313-05, ASTM International, pp. 1-7 (2005).

Bending Resistance (Stiffness) of Paper and Paperboard (Taber-type Tester in Basic Configuration), TAPPI T489, pp. 1-7 (2004).

Standard Test Method for Resistance to Bending of Paper and Paperboard (Taber-Type Tester in Basic Configuration), ASTM D5342. ASTM International, pp. 1-5 (2002).

Standard Test Method for Resistance to Bending of Paper to Low Bending Stiffness (Taber-Type Tester 0 to 10 Taber Stiffness Unit Configuration), ASTM D5650, ASTM International, pp. 1-5 (2002).

Standard Test Method for Apparent Bending Modulus of Plastics by Means of a Cantilever Beam, ASTM D747-02, ASTM International, pp. 1-6 (2002).

\* cited by examiner

UV CURABLE COATING COMPOSITIONS

CROSS-REFERENCE TO RELATED APPLICATIONS

This application is a 371 National Stage Application of PCT/US05/12336, filed on Apr. 12, 2005 and claims the benefit of U.S. Provisional Application No. 60/563,646, filed Apr. 20, 2004.

FIELD OF THE INVENTION

The present invention relates to ultraviolet ("UV") curable, abrasion resistant coating compositions and methods for applying such compositions to surfaces to provide abrasion resistance. In particular, the compositions of the present invention provide coatings to surfaces, such as road reflectors, to prevent abrasion and weathering thereof. The compositions of the present invention also may be applied to filter media to provide structural rigidity thereto.

BACKGROUND OF THE INVENTION

The surfaces of many molded or cast articles would benefit from showing resistance to abrasion. For instance, abrasion caused by outdoor weather conditions is a notorious cause for damage to such molded or cast articles. Conventional materials used to make molded or cast parts, however, do not typically possess sufficient surface hardness. As such, it is desirable to coat these surfaces with compositions that impart abrasion resistance thereto. For instance, the surfaces of molded road reflectors need to withstand a certain degree of abrasion due to contact from objects and weather conditions.

In addition, typical filters, such as oil filters, employ a wire screen to support the filter paper used therein because filter paper lacks rigidity. It is desirable, therefore, to coat conventional filter paper with a composition that imparts structural rigidity thereto, thereby alleviating the need for a wire screen. It also is important, however, that the coating composition not clog the filter paper.

The state of technology is not believed to provide a UV curable composition, reaction products of which having abrasion resistance to satisfy the needs of these and other applications.

SUMMARY OF THE INVENTION

The present invention relates to UV curable coating compositions, which provide abrasion resistance and/or structural rigidity to surfaces. In one such aspect of the present invention, there is provided a UV curable, abrasion resistant coating composition, which includes a curable (meth)acrylate, a photoinitiator which absorbs only in the UV range of the electromagnetic spectrum, and an inorganic filler, at least a portion of which having a particle size in the range of 1 to 1,000 nm. The particle size desirably is less than about 50 nm (diameter).

In another aspect of the present invention, there is provided a UV curable, abrasion resistant coating composition, which includes a photoinitiator which absorbs only in the UV range of the electromagnetic spectrum, the photoinitiator including 1-hydroxy-cyclohexyl-phenyl-ketone present in an amount between about 4.5% and about 5.5% by weight of the composition, trimethylolpropane triacrylate with colloidal silica nanoparticles present in an amount between about 69% and about 73% by weight of the composition, and dimethyl acrylamide present in an amount between about 22% and about 25% by weight of the composition.

In another aspect of the present invention, there is provided a UV curable, abrasion resistant coating composition, which includes a nanospheric colloidal dispersion of silica in a (meth)acrylate matrix, at least one reactive diluent, and at least one photoinitiator which absorbs only in the UV range of the electromagnetic spectrum.

In still another aspect of the present invention, there is provided an abrasion resistant coated road reflector, including a road reflector having a least one surface, the surface having a coating thereon which includes the reaction product of at least one curable (meth)acrylate, at least one photoinitiator which absorbs only in the UV range of the electromagnetic spectrum, and an inorganic filler, at least a portion of which having a particle size in the range of 1 to 1,000 nm.

In another aspect of the present invention, there is provided a road reflector having an abrasion resistant coating, the abrasion resistant coated road reflector formed by the process of providing a road reflector having at least one surface, applying a UV curable composition onto the surface, wherein the UV curable composition includes at least one photoinitiator which absorbs only in the UV range of the electromagnetic spectrum, silica having a particle size in the range of 1 to 1,000 nm, and at least one curable (meth)acrylate, and exposing the coated surface to UV light to cure the coating composition.

In yet another aspect of the present invention, there is provided a filter media having structural rigidity, formed by the process of providing a filter media having a surface, applying a UV curable composition onto the surface, wherein the UV curable composition includes at least one photoinitiator which absorbs only in the UV range of the electromagnetic spectrum, silica having a particle size in the range of 1 to 1,000 nm, and at least one curable (meth)acrylate, and exposing the coated surface to UV light to cure the coating composition.

The present invention also is directed to methods of applying UV curable compositions to surfaces. In one such aspect, there is provided a method for applying a UV curable, abrasion resistant coating to a surface, which includes spraying a UV curable composition onto the surface to a coating thickness of about 1 to 2 mils, wherein the UV curable composition includes at least one photoinitiator which absorbs only in the UV range of the electromagnetic spectrum, silica having a particle size in the range of 1 to 1,000 nm, and at least one curable (meth)acrylate, and exposing the coated surface to UV light to cure the coating composition.

In accordance with another aspect of the present invention, there is provided a method of imparting abrasion resistance to a surface, including the steps of providing an article having at least one surface; applying a UV curable composition onto the surface, wherein the UV curable composition includes at least one photoinitiator which absorbs only in the UV range of the electromagnetic spectrum, silica having a particle size in the range of 1 to 1,000 nm, and at least one curable (meth) acrylate; and exposing the surface to UV light to cure the composition to an abrasion resistant coating.

Application of the UV curable compositions of the present invention can impart such abrasion resistance and weatherability to these surfaces. In addition, the UV curable compositions of the present invention can be applied to filter media to impart structural rigidity thereto. The UV curable compositions of the present invention accordingly provide rigidity to filter media without compensating the permeability thereof.

DETAILED DESCRIPTION OF THE INVENTION

Figure 1:
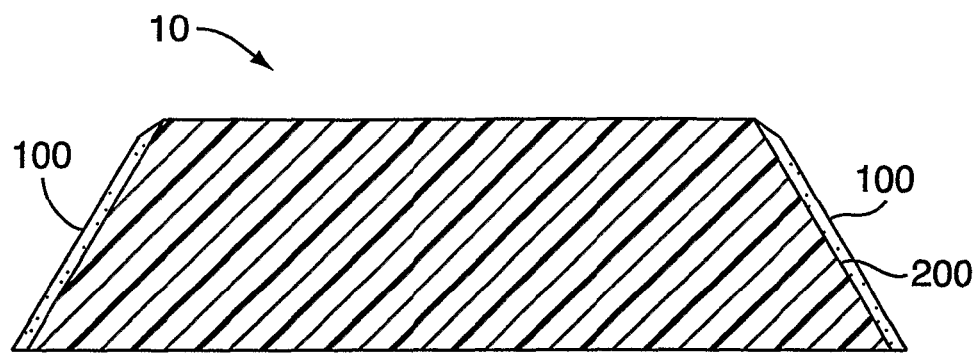
FIG. 1 is a cross-sectional view of a road reflector, in accordance with an embodiment of the present invention, having an abrasion resistant coating thereon.

The present invention relates to UV curable, coating compositions, as well as methods for applying such compositions to surfaces, such as, for example, road reflectors. The compositions of the present invention cure by exposure to UV light to form a film coating, which shows enhanced resistance to abrasion and weathering of the surface. In other embodiments, the compositions of the present invention are applied to filter media to provide structural rigidity thereto without clogging the filter media.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

The compositions of the present invention include at least one curable (meth)acrylate, at least one photoinitiator, and an inorganic filler. The photoinitiator absorbs only in the UV range of the electromagnetic spectrum. The compositions may further include a reactive diluent.

The curable (meth)acrylate component contained in the compositions of the present invention is a (meth)acrylate monomer. Examples of suitable (meth)acrylate monomers include, but are not limited to: urethane(meth)acrylates; polybutadiene(meth)acrylates, trimethylolpropane triacrylate; hexanediol diacrylate; alkoxylated hexanediol diacrylate; hydroxyl-bearing polyacrylate; hydroxyl double bond bearing polyester; tris(2-hydroxy ethyl)isocyanurate triacrylate; ethoxylated pentaerythritol tetraacrylate; and combinations thereof.

Curable (meth)acrylates, or a (meth)acrylate matrix, are present in the abrasion resistant coating compositions, for example, in an amount from about 5% to about 85% by weight in the final composition (w/w). Desirably, curable (meth)acrylates are present in an amount from about 65% to about 75% (w/w), and more desirably about 69% to about 73% (w/w).

The compositions of the present invention also include an inorganic filler. At least a portion of the filler component includes filler particles in the 1-1,000 nanometer ("nm") range. Desirably, the inorganic filler is colloidal silica nanoparticles. Such silica nanoparticles may be in a dispersion in the curable (meth)acrylate component. The filler may be present, for example, in amounts of about 30% to about 50% by weight of the (meth)acrylate component.

A commercially available example of such filler particles is sold under the tradename NANOCRYL, such as NANOCRYL XP 21/1045, by Hans Chemie, Germany. NANOCRYL fillers are nanosilica reinforced acrylates. In particular, NANOCRYL is a silica reinforced trifunctional acrylate monomer having a silica content of about 50% by weight. The silica component is surface-modified, synthetic $SiO_2$ nanospheres with a particle size of less than about 50 nm and a narrow particle size distribution. NANOCRYL is a colloidal dispersion of the silica nanoparticles in the curable acrylate.

Another commercially available example of filler particles is sold under the tradename HIGHLINK OG, by Clariant, France. HIGHLINK OG fillers are liquid suspensions of colloidal silica nanoparticles in an organic medium. The silica particles are spherical, non-porous, amorphous, non-agglomerated and monodispersed. The particle size ranges from about 10 nm to about 50 nm, and the silica content is about 30 to 50% by weight.

Yet another commercially available example of filler particles is sold under the tradename NANOPDX, such as NANOPDX XP 22, by Hans Chemie, Germany. NANOPDX fillers are monodisperse silica filler dispersions in epoxy resins, at a level of up to about 50% by weight. NANOPDX fillers ordinarily are believed to have a particle size of about 5 nm to about 80 nm, And NANOPDX XP 22 is reported to contain 40 weight percent of silica particles having a particle size of about 15 to 20 nm in the diglycidyl ether of bisphenol-F epoxy resin.

The abrasion resistant coating compositions of the present invention also include a photoinitiator, which absorbs only in the UV range of the electromagnetic spectrum. As such, the photoinitiator absorbs radiation at wavelengths lying outside, or shorter than, the visible light spectrum, generally less than about 400 nm. The photoinitiator responds to such UV radiation to initiate and induce curing of the curable (meth)acrylate component.

A variety of UV photoinitiators are known in the art and may be employed in accordance with the present invention. The photoinitiator may be a benzophenone or substituted benzophenone, such as, for example, an α-hydroxyketone. One particularly suitable α-hydroxyketone is 1-hydroxy-cyclohexyl-phenyl-ketone (commercially available as IRGACURE 184 from Ciba Specialty Chemicals, Inc.), which is represented by Ciba by the following structure:

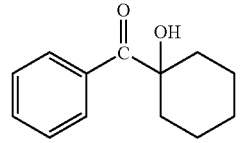

The absorption peaks for 1-hydroxy-cyclohexyl-phenyl-ketone appear at 246, 280, and 333 nm (in methanol). In accordance therewith, an embodiment of the present invention includes a photoinitiator that absorbs radiation at wavelengths of about 333 nm or shorter.

Other suitable α-hydroxyketones and blends thereof include: 2-hydroxy-2-methyl-1-phenyl-propan-1-one (absorption peaks at 245, 280, and 331 nm) (DAROCUR 1173); 2-hydroxy-1-[4-(2-hydroxyethoxy)phenyl]-2-methyl-1-propanone (absorption peaks at 276 and 331 nm) (IRGACURE 2959); and blends such as IRGACURE 1000 and IRGACURE 500 (all commercially available from Ciba Specialty Chemicals, Inc.).

Other suitable UN photoinitiators include, but are not limited to: acetophenone and substituted acetophenones; benzoin and its alkyl esters; xanthone and substituted xanthones;

diethoxy-acetophenone; benzoin methyl ether; benzoin ethyl ether; benzoin isopropyl ether; diethoxyxanthone; chloro-thio-xanthone; N-methyl diethanol-amine-benzophenone; 1-benzoyl cyclohexanol; 2-benzyl-2-(dimethylamino)-1-[4-(4-morpholinyl)phenyl]-1-butanone; amino ketones, such as IRGACURE 907, IRGACURE 369 and IRGACURE 1300 (all commercially available from Ciba Specialty Chemicals, Inc.); benzildimethyl-ketals, such as IRGACURE 651 (commercially available from Ciba Specialty Chemicals, Inc.); BAPO (bis acyl phosphine oxide) and blends thereof, such as IRGACURE 819, IRGACURE 1700, IRGACURE 1800, IRGACURE 1850, and DAROCUR 4265 (all commercially available from Ciba Specialty Chemicals, Inc.); metallocenes, such as IRGACURE 784 and ERGACURE 261 (both commercially available from Ciba Specialty Chemicals, Inc.); benzophenones, such as DAROCUR BP (commercially available from Ciba Specialty Chemicals, Inc.); and mixtures thereof.

Photoinitiators are present in the abrasion resistant coating compositions, for example, in an amount from about 1% to about 12% by weight in the final composition (w/w). Desirably, photoinitiators are present in an amount from about 3% to about 8% (w/w), and more desirably about 2.5% to about 3.5% (w/w).

The compositions of the present invention also may include a reactive diluent. A variety of reactive diluents may be employed, such as, for example, N,N-dimethyl acrylamide. Reactive diluents may be present in an amount from about 1% to about 30% by weight in the final composition (w/w). Desirably, reactive diluents are present in an amount from about 20% to about 27% (w/w), and more desirably about 22% to about 25% (w/w).

Further, the compositions of the present invention may include a light stabilizer. Light stabilizers generally prevent degradation due to UV radiation from sunlight. Light stabilizers conventionally include UV absorbers and hindered amine light stabilizers. In the compositions of the present invention, the light stabilizer desirably is free of ethylenic unsaturation, such that it will not polymerize and crosslink into the system.

Suitable light stabilizers, which are free of ethylenic unsaturation, include, but are not limited to: hydroxybenzotriazoles, such as 2-(2H-benzotriazol-2-yl)-4,6-bis(1-methyl-1-phenylethyl)phenol (available commercially as TINUVIN 900 from Ciba); hydroxyphenyltriazines, such as mixtures of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine (available commercially as TINUVIN 400 from Ciba); and hindered amine light stabilizers, such as mixtures of bis(1,2,2,6,6-pentamethyl-4-piperidinyl)sebacate and methyl(1,2,2,6,6-pentamethyl-4-piperidinyl)sebacate (available commercially as TINUVIN 292 from Ciba).

The compositions of the present invention generally have viscosities ranging from about 5 to about 3000 cps (at 25° C.). Desirably, the viscosity ranges from about 10 to about 300 cps, and more desirably about 53 to about 57 cps.

In accordance with the present invention, a desirable combination of the above components includes: trimethylolpropane triacrylate as the curable (meth)acrylate component having amorphous silica dispersed therein; N,N-dimethyl acrylamide as a reactive diluent; and 1-benzoyl cyclohexanol as the photoinitiator.

Another desirable combination of the above components includes: about 5% to about 85% w/w trimethylolpropane triacrylate as the curable (meth)acrylate component having about 20-60%, preferably 50%, colloidal silica nanoparticles dispersed therein; about 1% to about 12% w/w 1-hydroxy-cyclohexyl-phenyl-ketone as the photoinitiator; and about 1% to about 30% w/w N,N dimethyl acrylamide as a reactive diluent. The viscosity of the composition desirably ranges between about 5 and 3000 cps.

Yet another desirable combination in accordance with the present invention includes: about 65% to about 75% w/w trimethylolpropane triacrylate having about 50% colloidal silica nanoparticles dispersed therein; about 3% to about 8% w/w 1-hydroxy-cyclohexyl-phenyl-ketone; and about 20% to about 27% w/w N,N dimethyl acrylamide. The viscosity of the composition desirably ranges between about 10 and 300 cps.

A particularly desirable composition of the present invention includes: about 69% to about 73% w/w trimethylolpropane triacrylate with about 50% colloidal silica nanoparticles dispersed therein; about 2.5% to about 3.5% w/w 1-hydroxy-cyclohexyl-phenyl-ketone; and about 22% to about 25% w/w N,N dimethyl acrylamide. The viscosity of the composition desirably ranges between about 53 and 57 cps.

In accordance with the present invention, the UV curable compositions may be applied to a surface to form a coating thereon. For example, the composition may be applied to the surface of a road reflector or other similar article. In alternative embodiments, the composition may be applied to filter media paper, such as that used in oil filters, to provide rigidity thereto. Additional surfaces, however, are considered well within the scope of the present invention.

Upon exposure to UV light, the compositions of the present invention cure to a coating that imparts improved weatherability, abrasion resistance, and/or increased rigidity to the surface. For example, a road reflector 10 having an abrasion resistant coating 100 on the surface(s) 200 is shown in FIG. 1. The road reflector 10 may be made of any conventional material known by those skilled in the art. The coating 100 improves the ability of the road reflector 10 to withstand harsh weather conditions.

Figure 2:
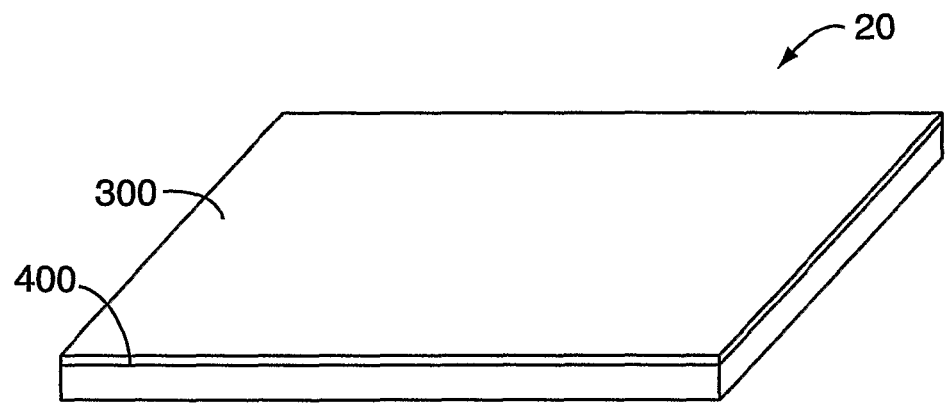
FIG. 2 is a perspective view of a coated filter paper of indeterminate size, in accordance with an embodiment of the present invention.
Figure 2A:
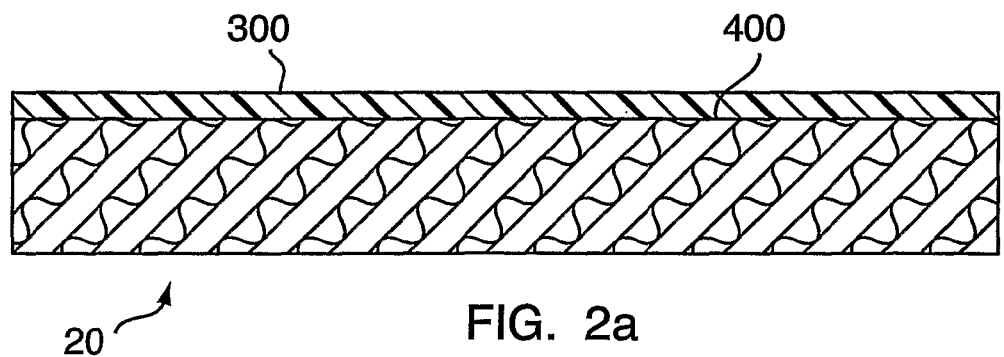
FIG. 2a is a cross sectional view of the filter paper of FIG. 2.

In accordance with another embodiment, as depicted in FIG. 2, a filter media, e.g., filter paper 20, is coated with a composition of the present invention. The coating 300 is applied to the surface(s) 400 of the filter paper 20 to provide structural rigidity thereto. Such rigidity allows the filter paper to be used in an apparatus, such as, but not limited to, an oil filter, without the need for a wire screen to provide support. Further, the compositions of the present invention desirably provide such rigidity without clogging the filter media.

In accordance with some embodiments of the present invention, the coatings provide abrasion resistance to a surface. The level of abrasion resistance imparted to a surface generally is determined by post-cure gloss maintained by the coating. Maintenance of post-cure gloss may be measured by subjecting the coated surface to abrasion resistance testing, such as that of Federal Specification FF-W-1825. In accordance with this test, the coated surface is subjected to a steel wool abrasion procedure. More specifically, grade 3 steel wool is placed on the coated surface. A load of about 50 lbs is applied, and the surface is rubbed about 100 times with the steel wool. The abrasion resistant coatings of the present invention desirably maintain about 90% of their post-cure gloss when subjected to this standard test, and more desirably about 95% of their post-cure gloss. The ability of the coatings to maintain such high gloss levels demonstrates their resistance to abrasive conditions.

In addition, once applied and cured, the compositions of the present invention desirably provide abrasion resistance without yellowing to a substantial degree over time. The degree to which an object color departs from its colorless or white nature toward yellow is measured by subjecting the coating to standard testing, such as ASTM E313, which is incorporated herein by reference. For instance, the coatings of the present invention desirably do not yellow more than about 40% when subjected to standard yellowness testing for 500 hours.

The present invention also is directed to methods for applying the UV curable coating compositions to a surface. According to these methods, a UV curable composition is sprayed onto a surface to a coating thickness of about 1 to 2 mils. The UV curable composition contains at least one photoinitiator which absorbs only in the UV range, an inorganic filler, desirably silica, and at least one curable (meth)acrylate. The composition also may include a reactive diluent, as well as other components as described above. Other conventional application means, such as, but not limited to, wipe-on or dipping, may be employed to apply the coating.

Once coated, the surface is exposed to UV light to cure the composition. For example, the coated article may be placed in a conveyor apparatus for cure. The Fusion conveyor system with "H" bulbs is an example of a suitable apparatus. In such a procedure, the article is placed on a conveyor belt having a belt speed of about 15 ft/min. Several lamps are positioned in the conveyor apparatus to provide UV light for cure. The lamps may be positioned, for example, at a height of about 4 inches from the surface of the coated article. Typical irradiance levels provided by the lamps are provided in Table 1 below.

TABLE 1

| Measurement | UV A (320-390 nm) | UV B (280-320 nm) | UV C (250-260 nm) | UV V (395-445 nm) |
|---|---|---|---|---|
| Peak Intensity (W/cm$^2$) | 0.589 | 6.00 | 0.082 | 0.36 |
| Energy (J/cm$^2$) | 1.208 | 1.172 | 0.148 | 0.688 |

As the article proceeds through the conveyor apparatus, the coated surface is exposed to the UV light source, and the composition is cured. The cured composition imparts abrasion resistance, improved weathering properties, and/or rigidity to the surface, which enable it, for example, to withstand harsh outdoor conditions.

EXAMPLES

Example 1

This example describes various formulations of components used to make UV curable compositions of the present invention. Table 2 depicts the weight percent of each of the components combined to form the compositions (Compositions A-G). The viscosities of Compositions A-G are desirably between about 5 and 3000 cps. Composition G, for example, had initial viscosities at 25° C. of about: 50 cps (25 rpm); 55 cps (50 rpm); and 53 cps (250 rpm).

TABLE 2

| Component | A | B | C | D | D-1 | E | F | G |
|---|---|---|---|---|---|---|---|---|
| Trimethylolpropane triacrylate with 50% silica | 80.00 | 74.20 | 74.10 | 76.20 | 76.20 | 76.10 | 75.60 | 71.20 |
| N,N-dimethyl acrylamide | 20.00 | 18.80 | 18.80 | 18.80 | 18.80 | 18.80 | 18.80 | 23.80 |
| 1-benzoyl cyclohexanol | 5.00 | 5.00 | 5.00 | 5.00 | 5.00 | 5.00 | 5.00 | 5.00 |
| Diphenyl (2,4,6-trimethylbenzoyl) phosphine oxide[1] | 2.00 | 2.00 | 2.00 | | | | | |
| Surfactant | | | 0.10 | | | 0.10 | 0.10 | |
| Hydroxybenzotriazole[2] | | | | | | | 0.50 | |

[1] Available from BASF Corporation as Lucirin ® TPO
[2] Available from Ciba Specialty Chemicals, Inc. as Tinuvin ® 900

After combining the components, the resulting Compositions AG were applied to a surface by spraying (20 psi air pressure) to form a coating thereon. In this Example, the surfaces were those of road reflectors (white or yellow), however these compositions may be applied to a variety of other suitable surfaces. The wet coating thicknesses as applied to the white and yellow reflector surfaces (or "sides") are listed in Table 3 for each of the compositions.

TABLE 3

| Composition | Coating Thickness (mil) | | |
|---|---|---|---|
| | White | Yellow | Side |
| A | 2 | 1 | 1 |
|   | 2 | 1.5 | 2 |
| B | 2 | 1.5 | 1 |
|   | 1.5 | 1.5 | 2 |
| C | 1 | 2 | 1 |
|   | 1.5 | 2 | 2 |
| D | 1.5 | 1 | 1 |
|   | 2 | 1.5 | 2 |
| D-1 | 1 | | 1 |
|   | 1.5 | | 2 |
| E | 1 | 2 | 1 |
|   | 1.5 | 1 | 2 |
| F | 1 | 2 | 1 |
|   | 1.5 | 1 | 2 |
| G | 2 | | 1 |
|   | 1.5 | | 2 |

The coated surfaces were exposed to UV light to effect curing. More specifically, the coated reflectors were placed in a Fusion conveyor apparatus having two UV lamps (fitted with "H" bulbs) positioned about four inches above the coated surfaces. The belt speeds were generally 13-15 ft/min. After exposure to the UV light, the cured coatings imparted abrasion resistance properties to the surfaces of the road reflectors.

Abrasion resistance was measured by subjecting the surfaces to standard abrasion resistance testing (Federal Specification FF-W-1825). In accordance with this procedure, gloss measurements were taken for one and/or two surfaces (sides) of the reflectors before and after abrasion with grade 3 steel wool. Table 4 lists these gloss measurements, as well as percent gloss maintained for each of Compositions A-G.

TABLE 4

| Composition | Gloss | White Side 1 | White Side 2 | Yellow Side 1 | Yellow Side 2 |
|---|---|---|---|---|---|
| A | initial | 67 | | 71 | |
|   | post | 64 | | 68 | |
|   | % maintained | 95.5 | | 95.8 | |
| B | initial | 67 | | 73 | |
|   | post | 65 | | 66 | |
|   | % maintained | 97.0 | | 90.4 | |
| C | initial | 67 | | 65 | 67 |
|   | post | 63 | | 65 | 60 |
|   | % maintained | 94.0 | | 100 | 89.6 |
| D | initial | 67 | 65 | 70 | 65 |
|   | post | 62 | 63 | 61 | 64 |
|   | % maintained | 92.5 | 96.9 | 87.1 | 98.5 |
| D-1 | initial | 69.0 | 67.2 | | |
|   | post | 65.6 | 62.2 | | |
|   | % maintained | 95.1 | 92.6 | | |
| E | initial | 67 | | 66 | |
|   | post | 63 | | 61 | |
|   | % maintained | 94.0 | | 92.4 | |
| F | initial | 69 | | 69 | |
|   | post | 65 | | 63 | |
|   | % maintained | 94.2 | | 91.3 | |
| G | initial | 68.6 | 68.4 | | |
|   | post | 65.3 | 65.4 | | |
|   | % maintained | 95.2 | 95.6 | | |

Compositions A-G maintained about 90% or higher gloss levels after exposure to abrasion resistance testing, with several compositions maintaining nearly 95% or higher. Therefore, when applied to articles that are exposed to harsh outdoor conditions, such as road reflectors, these coatings can improve weathering properties and/or abrasion resistance.

Example 2

This example describes another formulation of components used to make a UV curable composition of the present invention. Table 5 depicts the weight percent of each of the components combined to form the composition (Composition H).

TABLE 5

| Component | H |
|---|---|
| Trimethylolpropane triacrylate with 50% silica | 70.00 |
| N,N-dimethyl acrylamide | 25.00 |
| 1-benzoyl cyclohexanol | 5.00 |

The initial viscosities of Composition H at 25° C. were about: 50 cps (25 rpm); 50 cps (50 rpm); and 43 cps (250 rpm). As compared to Composition G, which contains the same components in the amounts listed in Table 2 above, Composition H has a lower viscosity due, at least in part, to the increased amount of reactive diluent (N,N-dimethyl acrylamide) present in the composition. Therefore, the viscosity of the compositions of the present invention may be altered in such manner as desired.

Example 3

This example describes another formulation of components used to make a UV curable composition in accordance with the present invention. Table 6 depicts the weight percent of each of the components combined to form the composition (Composition I).

TABLE 6

| Component | I |
|---|---|
| Trimethylolpropane triacrylate with 50% silica | 72.00 |
| N,N-dimethyl acrylamide | 25.00 |
| 1-hydroxycyclohexyl phenyl ketone | 3.00 |

The initial viscosity of Composition I at 25° C. was about 57 cps. Once applied to a surface and cured, Composition I was subjected to yellowness testing, as described above. The results were as follows:

TABLE 7

| Time | Degree of Yellowness |
|---|---|
| Initial | 3.15 |
| 500 hours | 4.41 |
| % Change | 39.68 |

After 500 hours of standard yellowness testing, the coating of the present invention yellowed to a degree of less than about 40%.

Example 4

This example describes the application of a composition of the present invention to filter media. Composition D, as listed in Table 2 above, was used. More specifically, Composition D was sprayed onto filter paper to increase the rigidity and stiffness thereof without clogging the filter paper. In accordance with this example, one or more applications of Composition D were sprayed onto the filter paper, on one or both sides of the filter paper. The number of applications and sides to which it was applied are indicated in Table 8 below, as well as the total weight of the coating (in g) that was applied (listed as Filter Papers J-N). After application, air permeability for each coated filter paper was measured in accordance with standard permeability testing, utilizing Frazier air permeability testing equipment. The equipment measures air flow, which is expressed in terms of volumetric flow per unit area, at a set differential pressure across a sample of the media. In accordance with such testing, a significant blinding, or clogging, of pores by the composition would be represented by a corresponding reduction in air permeability. The results of the air permeability testing, which are provided as Frazier measurements (averages), also are provided in Table 8 below. These Frazier numbers represent air permeability.

TABLE 8

| Filter Paper | Number of Applications/Sides | Coating Weight (g) | Frazier (avg) |
|---|---|---|---|
| J | 1/1 | 0.50 | 63.0 |
| K | 3/1 | 1.24 | 65.9 |
| L | 2/1 | 1.61 | 62.2 |
| M | 4/1 | 2.77 | 60.0 |
| N | 2/2 | 3.50 | 59.8 |

Figure 3:
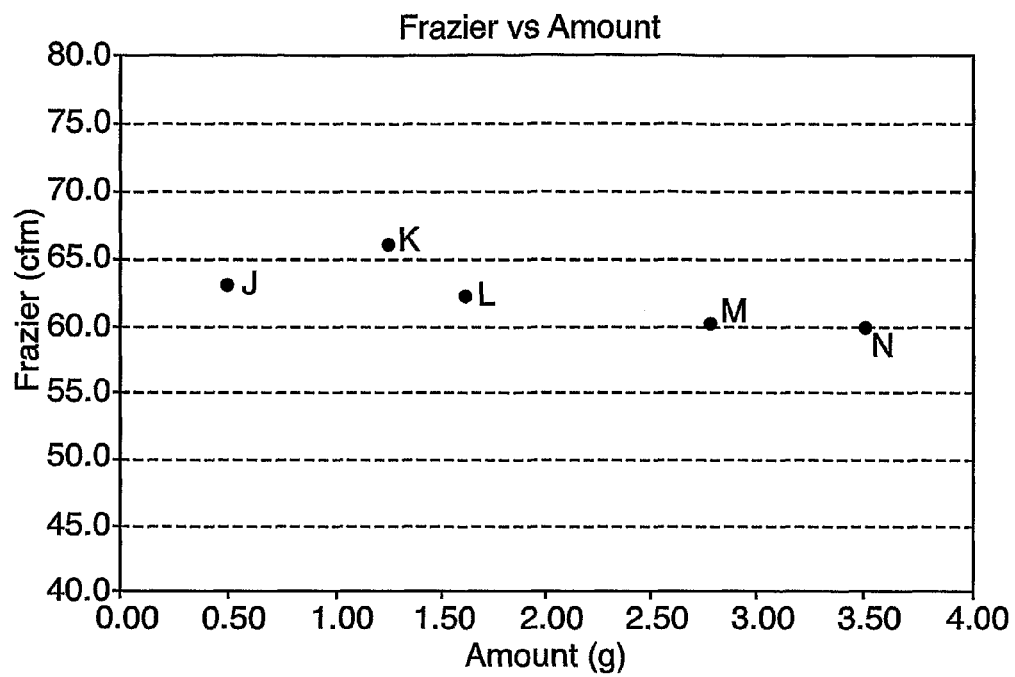
FIG. 3 is a graph depicting air permeability versus amount of a composition of the present invention as applied to filter media.

A corresponding graph depicting the air permeability averages (in cfm, i.e., cubic feet per minute or the "Frazier Number") versus amount (in g) of Composition D applied is depicted in FIG. 3. This data shows that the application of Composition D to filter paper had little or no effect on air permeability. Increasing the number of applications or sides to which it was applied similarly had little effect on air permeability. The composition of the present invention provided rigidity without clogging the filter paper.

Example 5

This example also describes the application of compositions of the present invention to filter media. In accordance with this example, Composition I, the components of which are listed in Table 6 above, was sprayed onto a number of filter paper samples. The coating weight for each sample is identified in Table 9 below (Filter Papers O-S).

TABLE 9

| Filter Paper | Weight (g) |
| --- | --- |
| O | 1.521 |
| P | 1.271 |
| Q | 1.625 |
| R | 1.812 |
| S | 1.895 |

Figure 4:
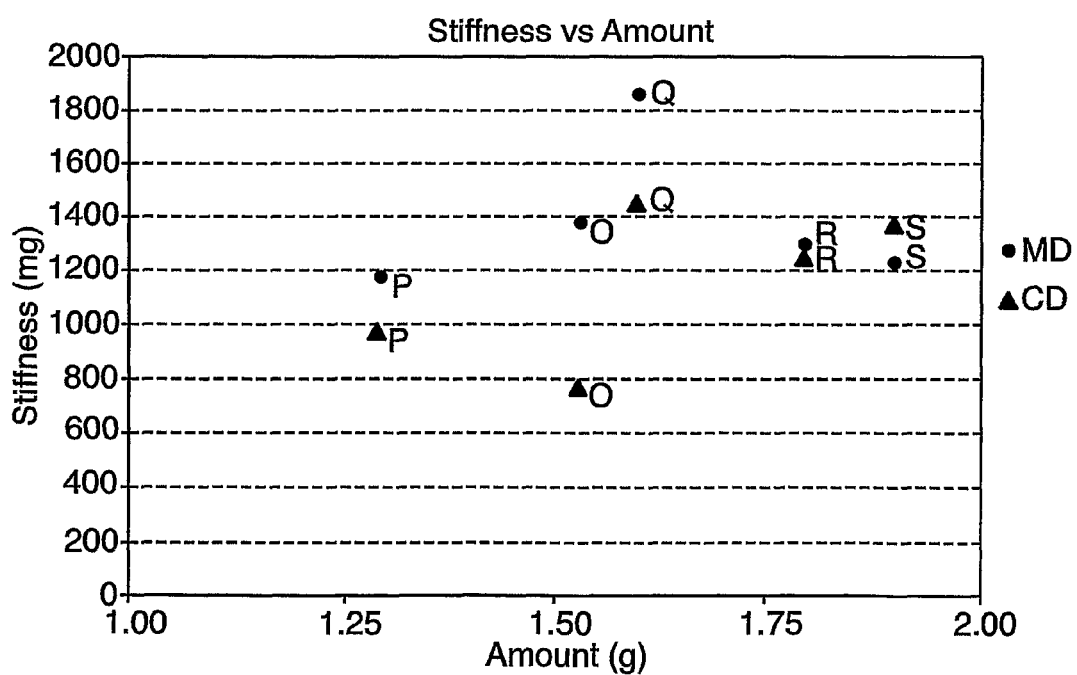
FIG. 4 is a graph depicting stiffness versus amount of a composition of the present invention as applied to filter media.

After application, stiffness for each coated filter paper was measured by subjecting the samples to standard stiffness testing using a Tabor Stiffness Tester. This equipment is used to provide accurate test measurements to +/−1.0% in stiffness and resiliency for evaluating paper board, plastic, metal, fabric, felt, leather, wire and other sheet materials in thickness of 0.004 inches to 0.125 inches (in accordance with TAPPI T489, ASTM D5342, ASTM D5650, ASTM D747 and UNE 57-075-74). The samples were cut and stiffness was measured in both the machine direction ("MD"), which is the long axis of the filter paper, and the cross direction ("CD"). The results of the stiffness measurements (in mg) versus the amount (in g) of the coating applied are depicted in FIG. 4. As can be seen in FIG. 4, the MD stiffness values are relatively close to the stiffness of a wire screen, or about 1600 mg. As such, these coatings can provide sufficient rigidity to filter paper to replace the wire screens conventionally used in oil filters, or any other similar apparatus.

The invention claimed is:

1. A UV curable coating composition which when cured is abrasion resistant, said composition consisting of:
   a) trimethylolpropane triacrylate in an amount between about 5% and about 85% by weight of the composition,
   b) N,N-dimethyl acrylamide in an amount between about 1 and about 30% by weight of the composition,
   c) an inorganic filler consisting of silica nanoparticles in an amount between about 30 and about 50% by weight of the composition and wherein at least about 50% of the silica nanoparticles are present as a premix with trimethylolpropane triacrylate, and
   d) at least one photoinitiator which absorbs only in the UV range of the electromagnetic spectrum;
wherein a cured coating of the UV curable coating composition maintains about 95% or higher of its post-cure gloss when subjected to about 100 cycles of grade 3 steel wool with a load of about 50 lbs applied per Federal Specification FF-W-1825.

2. The UV curable coating composition of claim 1, wherein the trimethylolpropane triacrylate is present in an amount between 5-69% by weight of the composition.

3. The UV curable coating composition of claim 1, wherein the silica nanoparticles have a particle size in the range of 1 to 1,000 nm.

4. The UV curable coating composition of claim 1, wherein the silica nanoparticles have a particle size of less than about 50 nm.

5. The UV curable coating composition of claim 1, wherein the silica nanoparticles are present in a colloidal dispersion with trimethylolpropane triacrylate of the composition.

6. The UV curable coating composition of claim 1, wherein the silica nanoparticles are spherical, non-porous, amorphous, non-agglomerated and monodispersed.

7. The UV curable coating composition of claim 1, wherein the silica nanoparticles have a particle size range of about 10 nm to about 50 nm.

8. A UV curable coating composition which when cured is abrasion resistant, said composition consisting of:
   a) trimethylolpropane triacrylate in an amount between about 5% and about 85% by weight of the composition,
   b) N,N-dimethyl acrylamide in an amount between about 1 and about 30% by weight of the composition,
   c) an inorganic filler consisting of silica nanoparticles in an amount between about 30 and about 50% by weight of the composition and wherein at least about 50% of the silica nanoparticles are present as a premix with trimethylolpropane triacrylate,
   d) at least one photoinitiator which absorbs only in the UV range of the electromagnetic spectrum, and
   e) at least one light stabilizer; wherein a cured coating of the UV curable coating composition maintains about 95% or higher of its post-cure gloss when subjected to about 100 cycles of grade 3 steel wool with a load of about 50 lbs applied per Federal Specification FF-W-1825.

9. The UV curable coating composition of claim 8, wherein the at least one light stabilizer is selected from the group consisting of hindered amine light stabilizers, hydroxyphenyltriazines, hydroxybenzotriazoles, and combinations thereof.

10. The UV curable coating composition of claim 1, wherein the composition has a viscosity of about 5 to about 3000 cps.

11. An abrasion resistant road reflector comprising at least one surface with a coating thereon of a composition consisting of:
   a) trimethylolpropane triacrylate in an amount between about 5% and about 85% by weight of the composition,
   b) N,N-dimethyl acrylamide in an amount between about 1 and about 30% by weight of the composition,
   c) an inorganic filler consisting of silica nanoparticles in an amount between about 30 and about 50% by weight of the composition and wherein at least about 50% of the silica nanoparticles are present as a premix with trimethylolpropane triacrylate, and
   d) at least one photoinitiator which absorbs only in the UV range of the electromagnetic spectrum,
wherein the coating when cured maintains about 95% or higher of its post-cure gloss when subjected to about 100 cycles of grade 3 steel wool with a load of about 50 lbs applied per Federal Specification FF-W-1825.

* * * * *